United States Patent Office 3,754,018
Patented Aug. 21, 1973

3,754,018
NOVEL REACTIONS OF HCN, HF AND OLEFINS
Louise DeVries, Greenbrae, Calif., assignor to Chevron Research Company, San Francisco, Calif.
No Drawing. Filed May 8, 1970, Ser. No. 35,896
Int. Cl. C07c 121/04, 121/02, 121/42
U.S. Cl. 260—465.3
12 Claims

ABSTRACT OF THE DISCLOSURE 1-cyano-1,2-diimino compounds and derivatives thereof are prepared by the reaction of hydrofluoric acid and hydrocyanic acid with an olefin. The resulting product, which is a ketenimine or its tautomer, can be treated with a variety of nucleophilic reagents to form such compounds as triaminoacrylonitrile, derivatives of oxalimidic acid, etc. The compounds can be used as a controlled source of hydrocyanic acid or amines, as monomers for polymerization, with dienes in Diels-Alder reactions, as chelating agents and acylating agents.

BACKGROUND OF THE INVENTION

Field of the invention

Cyano and polycyano compounds have been widely studied because of the desirable properties which the compounds exhibit. Tetracyanoethylene was a major development in preparing compounds which had properties theretofore unachieved. Tetracyanoethylene is a strong oxidizing agent, forms strong complexes with aromatic compounds which were found to be electrical conductors, and is used to prepare dyes for a variety of colors and shades, by modification of well known chromophores.

Hydrocyanic acid tetramer can be prepared from hydrocyanic acid in low yield and is a nitrogen source and has pesticidal activity. The hydrocyanic acid tetramer reacts with oxocarbonyls to form imine derivatives, which can be used to characterize the carbonyl compound.

Description of the prior art

A number of articles concerning the structure proof of hydrocyanic acid tetrameter and the use of the tetramer are found in a series of Japanese articles abstracted in Chem. Abstracts, 61, 3692g, 11259b and 14157d. Diaminomaleonitrile and its reactions are described in Ferris et al., J. Am. Chem. Soc., 87, 4976 (1965); ibid., 88, 1074 (1966). Hydrocyanic acid tetramer is also reported in U.S. Pat. No 2,722,540 Tetracyanoethylene is described in U.S. Pat. No. 3,166,584. Tetraaminoethylenes and their reactions and uses are described in an article by D. M. Lemal, "The Chemistry of the Amine Group," Edited by S. Patai, Interscience Publications, New York (1960), Chapter XII, page 701.

SUMMARY OF THE INVENTION

Cyanodiiminoethylenes, their tautomers, and their derivatives are prepared by combining hydrocyanic acid, hydrofluoric acid and an olefin under mild conditions in the absence of an active protic species. The resulting product is hydrocarbyl aminocyano ketenimine or its tautomer—N,N'-substituted-diimino propionitrile.

DETAILED DESCRIPTION OF THE SPECIFIC EMBODIMENTS

In the subject process, an olefin, hydrocyanic acid and hydrogen fluoride are combined, either in the presence or absence of an inert solvent, and the components allowed to react for a sufficient time under mild conditions. When the reaction mixture is substantially complete, unreacted reactants are removed and the product may be worked up by treatment with base.

The temperature for the entire reaction will usually be at least −10° C., more usually at least 0° C., and normally not exceed 100° C. Because of the volatile nature of the hydrocyanic acid and hydrofluoric acid, temperatures much above 35° C. will require pressure equipment. Therefore, whenever the reaction proceeds at a reasonable rate, at 25° C. or below, these temperatures are preferred. As for the pressure for the reaction, the pressure will normally vary from atmospheric to the autogenous pressure of the reaction mixture at the temperature employed.

The individual times for the process will vary widely, depending on the reactants, the concentration of the reactants, and the temperature for the reaction. With lower temperatures, longer times will be required. Normally, the time will be at least 0.5 hours and may range to as long as 200 hours, usually not more than 48 hours.

The ratio of the reactants may be varied widely and is primarily one of convenience to insure major conversion of the most expensive reactant. Since in most instances, the hydrofluoric acid and hydrocyanic acid can be recovered easily, economic considerations mediate that the olefin be in the lowest mol proportion. The mol ratio of hydrocyanic acid to olefin will usually be about 0.5–20:1, more usually 1–15:1 and preferably 1–5:1. The mol ratio of hydrofluoric acid to hydrocyanic acid will normally be at least 0.9:1 and generally not more than about 10:1. Usually, it will be from about 1–2 mols of hydrofluoric acid per mol of hydrocyanic acid. The mol ratio of hydrofluoric acid to olefin will normally not exceed 20 to 1.

When an invert solvent is used, the weight percent of olefin reactant may be varied widely, depending on the desired concentration and the molecular weight of the olefin. Usually, the concentration of the olefin based on olefin and solvent will vary from about 5 weight percent to about 80 weight percent, more usually from about 20 weight percent to 75 weight percent. The other reactants will be present in the above indicated proportionate amounts.

The order of addition of the reactants in the first phase is not critical. Conveniently, the olefin may be introduced into an inert reaction vessel, either neat or dissolved in a solvent. Hydrocyanic acid and hydrofluoric acid may then be added to the vessel. The vessel will normally be maintained at 15° C. or lower, when the hydrocyanic acid and hydrofluoric acid are introduced, in order to insure complete condensation of the two acids.

After the initial reaction product has been formed, the volatile materials may then be removed by evaporation, distillation, etc. and the product isolated. The product may be treated with cold aqueous caustic to remove any residual acid before further purification. Alternatively, depending on whether subsequent reactions are intended, additional solvent may be added, with or without the removal of the original solvent.

Reactants

Any hydrocarbon olefin may be used. The olefins may be aliphatic, alicyclic, araliphatic, terminal or internal, exocyclic or endocyclic, and may have from 0 to 4 hydrocarbon groups bonded to the olefinic carbon atoms. Mono- or polyolefins may be used, the polyolefins being nonconjugated. (When referring to mol ratios, in the case of polyolefins, it is intended mols of reactant per olefinic group present.)

The monoolefins will normally be from about 2 to 500 carbon atoms. Except for ethylene, the olefins will have at least one hydrocarbon substituent bonded to an olefinic carbon atom and preferably the olefins will have two hydrocarbon substituents bonded to the olefinic carbon atom, the substituents being symmetrically substituted.

That is, the preferred olefins are those which, upon addition of a proton to the double bond, provide a tertiary carbonium ion.

Since any olefin may be used, the number of carbon atoms may be varied widely, from low boiling monoolefins such as ethylene and propylene, to high molecular weight polymers which are mono- or polyolefinic. The molecular weight of the olefins may vary from 28 to, for polyolefins, as high as 500,000, although most olefins which are employed in the process of this invention will be of from about 56 molecular weight (4 carbon atoms) to about 5,000 molecular weight. While usually the olefins will have only from 1 to 2 sites of olefinic unsaturation, they may have as high as 50 sites of unsaturation. More usually, the olefins will have from about 1 to 6 sites of unsaturation. For certain uses where oil solubility is desired, the olefins will generally vary from 21 to 200 carbon atoms, more usually 30 to 100 carbon atoms. Where lower molecular weight materials are desirable, the olefins will generally vary from about 4 to 20 carbon atoms.

Olefins which are particularly useful are those having the following formula:

$$A-\underset{\underset{A^1}{|}}{C}=CH_2$$

wherein

A is alkyl of from 1 to 200 carbon atoms, usually 1 to 30 carbon atoms; and $A^1$ is lower alkyl (1 to 6 carbon atoms), more usually of from 1 to 2 carbon atoms.

Illustrative olefins include ethylene, propylene, butene-1, butene-2, isobutylene, octene-1, 1,5-hexadiene, 1,7-octadiene, decene-1, decene-2, octadecene-1, polypropylene, tripropylene, tetrapropylene, diisobutylene, triisobutylene, tetraisobutylene, polyisobutylene of from about 420 to 5,000 molecular weight, polypropylene of from about 300 to 5,000 molecular weight, allylbenzene, allylnaphthalene, 4-methyl pentene-1, eicosene,triacontene, tetracontene, cyclohexane, menthene, octahydronaphthalene, cyclooctene, vinylcyclohexane, methylenecyclopentane vinylcyclohexene, copolymer of isoprene and styrene, 3-cholestene, etc.

Products

The initial product of the reaction is a ketenimine of the formula:

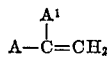

wherein the R groups may be the same or different and are derived from the olefin, the bond to nitrogen normally being at the more highly substituted carbon atom of the olefin. R will be of from 2 to 300 carbon atoms, more usually of from 2 to 200 carbon atoms, most frequently of from 4 to 80 carbon atoms. Depending on the use of the product, R may vary from 2 to 30 or 30 to 200 carbon atoms, as a radical having a single structure or molecular weight, or a mixture of radicals of different structure and/or molecular weight.

The following flow diagram indicates the formation of the ketenimine and the products which may be obtained either directly or indirectly from the ketenimide:

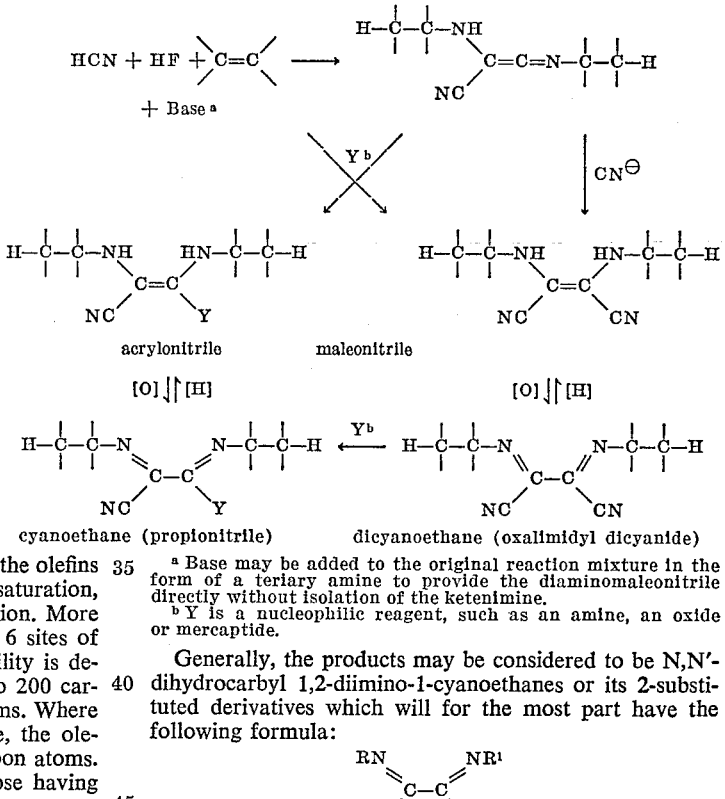

a Base may be added to the original reaction mixture in the form of a tertiary amine to provide the diaminomaleonitrile directly without isolation of the ketenimine.
b Y is a nucleophilic reagent, such as an amine, an oxide or mercaptide.

Generally, the products may be considered to be N,N'-dihydrocarbyl 1,2-diimino-1-cyanoethanes or its 2-substituted derivatives which will for the most part have the following formula:

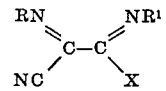

wherein

R and $R^1$ are the same or different and are hydrocarbon of from 2 to 300 carbon atoms, more usually of from 2 to 200 carbon atoms, and conveniently of from 4 to 30 carbon atoms. Depending on the use of the product, R and $R^1$ will normally be in the range of from about 30 to 200 carbon, atoms, or in the range of about 4 to 30 carbon atoms;

X may be hydrogen, cyano, hydrocarbyloxy, hydrocarbyl mercaptide amino, hydrocarbyl amino and dihydrocarbyl amino. X will normally be, when containing carbon, of from 1 to 200 carbon atoms, more usually of from 1 to 30 carbon atoms.

With compounds prepared from monoolefins, the compositions of this invention will normally have at least 7 carbon atoms, more usually at least 12 carbon atoms and not more than about 600 carbon atoms, more usually not more than about 400 carbon atoms. The lower molecular weight compounds will usually have from about 9 to 60 carbon atoms. Preferred R groups are aliphatic of from 4 to 30 carbon atoms. Depending on the use of the compositions, the range of the number of carbon atoms will be from about 10 to 30 or from about 30 to 200.

When X is hydrogen, the compound may exist in the form of the propionate having the following formula:

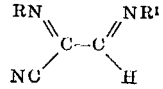

or as ketenimine of the following formula:

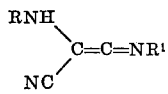

wherein R and $R^1$ are as defined previously.

From the ketenimine, either directly or indirectly from the reaction mixture, a variety of products can be obtained. These compounds (acrylonitrile) for the most part will have the following formula:

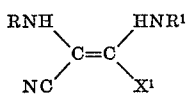

wherein $X^1$ is amino, cyano, hydrocarbyloxy, hydrocarbyl mercapto, hydrocarbyl amino, or dihydrocarbyl amino of from 1 to 80 carbon atoms, more usually of from 1 to 30 carbon atoms; and R and $R^1$ are as previously defined.

When $X^1$ is cyano, the compounds are substituted diaminomaleonitriles and will have the following formula:

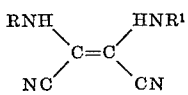

wherein R and $R^1$ are as defined previously.

Illustrative compounds include

N,N'-diethyl diaminomaleonitrile,
N,N'-dioctyl diaminomaleonitrile,
N-butyl-N'-octyl diaminomaleonitrile,
N,N'-dioctadecyl diaminomaleonitrile,
N,N'-dipolyisobutyl dimainomaleonitrile,
N,N'-dipolypropenyl diaminomaleonitrile, etc.

The compounds prepared having a hydrocarbyloxy or a hydrocarbyl mercaptide group will have the following formula:

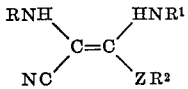

wherein

R and $R^1$ are as defined previously;
Z is chalcogen of atomic No. 8 to 16 (oxygen or sulfur); and
$R^2$ is a hydrocarbon group of from 1 to 60 carbon atoms, more usually of from 1 to 30 carbon atoms, and most usually alkyl of from 1 to 12 carbon atoms.

When $X^1$ is amino, hydrocarbyl amino or dihydrocarbyl amino, the compound will have the following formula:

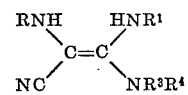

wherein

R and $R^1$ have been defined previously; and
$R^3$ and $R^4$ are the same or different and are hydrogen or hydrocarbons of from 1 to 60 carbon atoms, more usually of from 1 to 30 carbon atoms, the total number of carbon atoms being from about 1 to 80, more usually from about 2 to 30. While $R^3$ and $R^4$ may be aliphatic, alicyclic, aromatic or taken together with the nitrogen to which they are attached, heterocyclic, usually $R^3$ and $R^4$ will be hydrogen or alkyl of from 1 to 12 carbon atoms, more usually alkyl of from 1 to 6 carbon atoms.

Illustrative compounds include
2,3-di(butylamino)-3-diethylaminoacrylonitrile,
2,3-di(octadecylamino)-3-di(hexyl)-aminoacrylonitrile,
2,3-di(polyisobutenylamino)-3-methylanilinoacrylonitrile,
2,3-di(octylamino)-3-methylethylaminoacrylonitrile,
2,3-di(dodecylamino)-3-piperidinoacrylonitrile,
2,3-di(octadecylamino)-3-methyl-aminoacrylonitrile,
2,3-di(hexylamino)-3-butylaminoacrylonitrile.

The above compounds which are diamine substituted acrylo- or maleonitriles may be readily oxidized under mild conditions to the diimino compound. Alternatively, the diamino compound can be reduced with a variety of catalysts under hydrogenation conditions to the acrylo- or maleonitriles.

The diimino compounds will have the following formula:

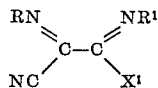

wherein R, $R^1$ and $X^1$ are all as defined previously.

Hydrocarbyl is any radical composed solely of carbon and hydrogen which may be aliphatic, alicyclic or aromatic or combinations thereof. In those instances where an olefin is intended or a hydrocarbon group is derived from an olefin, hydrocarbyl intends aliphatic, alicyclic, alicyclicalkyl, alkylalicyclic, aralkyl, alkarylalkyl, arylalicyclic, etc. That is, aryl groups must be bonded either to an aliphatic or alicyclic group. Hydrocarbyl groups may be saturated or unsaturated, but in the present invention are preferably free of aliphatic unsaturation.

Preparation of derivatives

The diamino substituted maleonitriles may be obtained directly by adding to the reaction mixture at least about 1 mol of tertiary amine per mol of olefin initially charged. The tertiary amine may be added to the reaction mixture at the completion of the reaction, as long as hydrocyanic acid is still present in the mixture. Therefore, at least a total of two mols of HCN per mol of olefin will have been present during the course of the reaction. While large excesses of the tertiary amine may be added, normally, not more than about 5 mols of the tertiary amine will be added per mole of olefin initially charged, more usually not more than about 3 mols.

The temperature for the reaction will normally be not more than about 50° C. and may be as low as —20° C., preferably in the range of about —10 to 30° C. The same or different solvents may be used as used in the initial reaction, where the tertiary amine is added at the end of the reaction.

The time for the reaction will vary widely, usually being at least 0.5 hour and normally not exceeding 24 hours, more usually being from about 1 to 6 hours. The time for the reaction will be dependent upon the other variables, such as concentration, temperature, reactants, etc. and the time which gives the greatest yield, can be readily determined.

Since the tertiary amine employed does not become incorporated into the reaction product, any tertiary amine may be used. Normally, the tertiary amine will be from about 3 to 30 carbon atoms, preferably of from about 3 to 12 carbon atoms. While any amine can be used within the above carbon range, usually, the amine of choice will be a trialkyl amine, the alkyl groups being of from 1 to 6 carbon atoms.

The di(hydrocarbyl)amino-di(monohydrocarbyl amino) acrylonitriles can be readily prepared by adding a secondary amine to the reaction product, after the hydrofluoric acid and hydrocyanic acid have been removed. The reaction may be carried out in a variety of inert solvents such as ethers, halohydrocarbons, etc. From about 0.5 to 20 mols of secondary amine may be added per mol of olefin initially charged, more usually from about 1 to 10 mols of secondary amine will be added per mol of olefin initially charged. If desired, at least one mol of tertiary amine may be added per mol of olefin initially charged.

The remaining derivatives can be obtained either from the ketenimine product initially formed or from the dicyano oxalimidic acids. By oxidation the diaminomaleonitriles and derivatives can be transformed to the oxalimidyl cyanide and derivatives and by reduction the reverse can be carried out.

The reaction occurs at from about $-10$ to $50°$ C. and usually takes from about 0.5 to 24 or longer hours, depending upon the various variables, such as temperature, concentration, reactants, etc. Inert solvents which have been described previously may be employed to advantage.

The hydrocarbyloxides or mercaptides will normally be of from about 1 to 60 carbon atoms, more usually of from 1 to 30 carbon atoms, and normally used as their of the reactant will be employed per mol of ketenimine ammonium or alkali metal salts. At least about 1 mol or oxalimidyl cyanide. Normally, not more than about 10 mols will be used, and more usually not more than about 5 mols.

The following examples are offered by way of illustration and not by way of limitation.

EXAMPLES

Example I

Into a polyethylene reactor fitted with a polyethylene condenser and magnetic stirrer was introduced 50 g. of 2,4,4-trimethyl pentene-2 in 70 ml. of dichloromethane and the solution cooled to 18° C. Into this cooled solution was condensed 54 ml. (3 equivalent weights) of hydrogen cyanide and 28 g. (3 equivalent weights) of hydrogen fluoride and the mixture stirred at room temperature for 2 hours. At the end of this time, the solvent and unreacted hydrofluoric acid and hydrogen cyanide were removed by sparging with nitrogen and the residue diluted with ether.

One-half of the ether solution was added to a solution of 82 g. of diethylamine in 100 ml. of ether cooled with an ice bath. The mixture was then allowed to stir at room temperature for one hour and stand overnight at ambient temperatures. At the end of this time, the solution was stripped in vacuo, the residual diluted with pentane and twice recrystallized from pentane followed by three recrystallizations from methanol.

*Analysis* (percent): C=73.1; H=12.22; N=14.23.

Example II

Into a polyethylene reactor fitted with a polyethylene condenser was introduced 30 g. of polyisobutylene (about 1,000 average molecular weight) in 70 ml. of dichloromethane, the reaction mixture cooled to $-5°$ C. and 15 ml. of hydrogen cyanide and 10 g. of hydrogen fluoride distilled into the vessel. The temperature was maintained overnight while the mixture was stirred. At the end of this time, volatile materials were removed by sparging with nitrogen while maintaining the ice bath temperature. The residue was then diluted with ether and 10 equivalent weights based on polyisobutylene of diethylamine was added and the mixture allowed to warm to room temperature. After stirring the mixture for two hours, the product was precipitated with methanol and the purified by reprecipitation from pentane with methanol for a total of 3 times.

*Analysis* (percent): N=2.67.

Example III

Into a polyethylene reactor fitted with a polyethylene condenser was introduced 50 g. of polyisobutylene (about 1,000 average molecular weight) in 100 ml. of dichloromethane, the solution cooled with an ice bath and 14 ml. of hydrogen cyanide and 11 g. of hydrogen fluoride distilled into the solution. The mixture was allowed to warm to room temperature and stirred for 16 hours. At the end of this time, the volatile materials were removed by sparging with nitrogen. An aliquot of 10 g. of the residue was dissolved in hexane and 6 g. of diethylamine added and the mixture stirred for 4 hours. At the end of this time, benzene was added and the solution was heated to 70° C. for two hours. The product was then purified by thrice reprecipitating the product from pentane solution with methanol.

*Analysis* (percent): N=2.76.

Example IV

Into a polyethylene reaction vessel was introduced 80 g. of 2,4,4-tirmethylpentene-2 in 100 ml. of dichloromethane and the solution cooled to 10° C. Into the cooled solution was distilled 29.6 g. (1.5 equivalent weights) of hydrogen cyanide and 22 g. (1.5 equivalent weights) of hydrogen fluoride. The mixture was allowed to warm to room temperature and was stirred for 3 hours. At the end of this time, one-eighth of the solution was withdrawn and to the remainder was added 2.3 equivalent weight of triethylamine (based on olefin) and the solution stirred for 24 hours. The mixture was then stripped in vacuo and the residue recrystallized from hexane, methanol and then hexane again. The product was a white crystalline solid. The product was N,N'-di(2,4,4 - trimethylpentyl-2)-diaminomaleonitrile.

Into a reaction vessel was charged 13 g. of the solid product in 20 ml. of benzene. To the solution was added dropwise with cooling 9.45 g. of benzoyl peroxide. A deep red color formed initially which then faded slowly. The product was heated to reflux (80° C.) for 4 hours. At the end of this time, the solvent was evaporated, and the residue recrystallized twice from methanol. The product was a white crystalline solid and substantially a stoichiometric amount of benzoic acid was recovered.

*Analysis* (percent): C=72.57; H=10.14; N=16.3.

The one-eighth volume aliquot was added to dimethylamine and stirred at room temperature for 24 hours. The product was then stripped in vacuo, crystallized from hexane, methanol, and hexane again. The product was a white crystalline solid which was found not to be stable at room temperature in air.

*Analysis.*—Fd. (percent): C, 73.07, H, 11.87, N, 14.98. Molecular Weight (ThermoNAM)=378.

Example V

Into a polyethylene reactor equipped with a polyethylene condenser was introduced 142 g. of 2,4,4-trimethylpentene-2 in 170 ml. of dichloromethane, the solution cooled to 10° C., and 51 g. (1.5 equivalent weight) of hydrogen cyanide and 38 g. (1.5 equivalent weight) of hydrogen fluoride distilled in. The mixture was allowed to warm to room temperature and stirred for 3 hours. Approximately 40% of the above solution was transferred to another reaction vessel and cooled to ice bath temperature. To the cool solution was added slowly 120 g. of triethylamine. The solution was allowed to stir at room temperature for 1 hour. The volatiles were removed in vacuo and pentane was added to the residue. After standing at $-10°$ C. overnight, 20 g. of product were collected by filtration.

Example VI

Into a polyethylene reactor equipped with a polyethylene condenser and magnetic stirrer was charged 100 g. of 2,4,4-trimethylpentene-2 and 138 cc. of dichloromethane. The reactor was cooled to 0° C., the condenser filled with ice and 75.6 g. (3.15 equivalents) of HCN and 56 g. (3.0 equivalents) of hydrofluoric acid distilled in. After allowing the mixture to warm to room temperature, the mixture was stirred for two hours, at which time violatile materials were removed by sparging with nitrogen. The residue was poured with vigorous stirring into a concentrated aqueous solution of potassium hydroxide containing crushed ice, being cooled externally by ice. When the addition was complete, the solution was extracted with 300 cc. of pentane. The pentane was then evaporated, leaving 107.3 g. of an orange colored oil product. A portion of the product was recrystallized by cooling a pentane solution to −80° C. The resulting product was a light yellow oil melting at about 14 to 16° C.

*Analysis.*—Calcd. (percent): C, 74.68; H, 11.57; N, 13.75. Fd. (percent): C, 74.21; H, 11.32; N, 13.73. Molecular weight (ThermoNAM), 307. The infrared, ultraviolet and nuclear magnetic resonance spectra are all consistent with the product being N-tert.-octylamino tert.-octylamino cyanoketenimine (tert.-octyl-2,4,4-trimethyl-2-pentyl).

Example VII

The procedure of Example VI was substantially followed until after sparging. When the sparging was complete, to ensure total removal of the unreacted hydrocyanic acid, the residue was transferred to a stainless steel round bottom flask and all volatile materials removed at room temperature at a pressure of 1 mm. Hg. The residue was then generally added over a 45 minute period to a round bottom flask containing 200 cc. of triethyl amine cooled with an external ice bath. After the addition was complete, the reaction mixture was allowed to warm to room temperature, and the triethyl amine removed in vacuo. The residue was extracted with pentane, leaving the hydrofluoride salt of triethyl amine undissolved. The pentane solution was then evaporated free of pentane, leaving a residual oil, whose IR spectrum was substantially identical to the product obtained in Example VI.

Example VIII

A solution containing 5.2 g. of the product described in Example VI was stirred for two hours with a concentrated aqueous solution of 5 g. of sodium cyanide. The organic layer was then evaporated to dryness and the residue crystallized from pentane at 0° C., yielding 3.85 g. of a crude product. After one recrystallization from hexane, the melting point of the product was found to be 107.5–108°. The product is the 1,2-di-tert.-octylamino-1,2-dicyanoethylene or N,N'-di-tert.-octyl diaminomaleonitrile.

*Analysis.*—Calcd. (percent): C, 72.20; H, 10.92; N, 16.87. Fd. (percent): C, 72.27; H, 11.00; N, 16.98. Molecular weight (ThermoNAM, acetone), 365. The spectral data were consistent with the above product.

The same product could be obtained in the following manner. A 10 g. quantity of the product of Example VI was dissolved in 20 cc. of triethyl amine and 3 g. of hydrocyanic acid distilled into the mixture. After two hours, all volatile materials were removed by sparging with nitrogen, and the resulting residue was then recrystallized from methanol at −10° C. The recrystallized product weighed 4.6 g. and was identical with the product obtained above.

Example IX

Following the procedure of Example VI, 142 g. of diisobutylene, 51 g. (1.5 equivalents) of hydrocyanic acid and 38.0 g. (1.5 equivalents) of hydrofluoric acid were combined and allowed to react. Excess triethyl amine was added to the cold reaction mixture. When the addition of the triethyl amine was complete, the volatiles were removed by sparging with nitrogen, and the residue extracted with hot hexane, leaving the hydrogen fluoride salt of triethyl amine undissolved. A crystal precipitate was obtained by cooling the hexane extract to −10° C., the precipitate being recrystallized from hexane again, followed by recrystallization from methanol at −10° C.

The product was identical to that obtained in Example VIII.

Example X

To a solution of 1,2-di-tert.-octylamino-1,2-dicyanoethylene (13 g., 1 equivalent) in 150 cc. of benzene at room temperature was added dropwise with vigorous stirring 9.45 g. of benzoyl peroxide in 50 cc. of benzene. An orange color developed upon the addition of the first drops of benzoyl peroxide and the color remained until the addition was finished. Shortly thereafter, the color faded to light yellow. The benzene solvent was removed in vacuo and the residue dissolved in hot hexane. Upon cooling, 7.5 g. of benzoic acid was isolated. The remaining benzoic acid dissolved in solution was removed by extracting with aqueous sodium bicarbonate solution. The hexane was then removed in vacuo, and the residue twice recrystallized from methanol and once from hexane, by cooling the solutions to −10° C.

*Analysis.*—Calcd. (percent): C, 72.77; H, 10.38; N, 16.95. Fd. (perecnt): C, 72.57; H, 10.15; N, 16.82. Molecular weight (ThermoNAM, acetone), 331. The spectral data were consistent with the product being 1,2-di-tert.-octylimino-1,2-dicyanoethane.

A 1 g. quantity of the above product in ethyl acetate solution was hydrogenated using 75 mg. of a 5% palladium on carbon catalyst. When 1 equivalent of hydrogen had been absorbed, the hydrogen uptake virtually stopped. The catalyst was removed by filtration, the solvent evaporated in vacuo and 0.87 g. of a crystalline residue isolated. This product was identical with the diamino dicyanoethylene used in the reaction with the benzoyl peroxide.

Example XI

Into 100 cc. of methanol was dissolved 2 g. of 1,2-di-tert.-octylimino-1,2-dicyanoethane and 0.67 g. of sodium methoxide in 20 cc. of methanol added. After standing for three days at room temperature, the solvent was evaporated in vacuo and the residue extracted with hot hexane. Upon concentration and subsequent cooling of the extract, 0.8 g. of the initial reactant was recovered. The remaining hexane solution was chromatographed through a silica column. From a pentane eluate, 0.67 g. of 1,2-di-tert.-octylimino-2-cyano-2-methoxyethane was recovered. This product was recrystallized from methanol at −50° C. and had a melting point below room temperature.

*Analysis.*—Calcd. (percent): C, 71.57; H, 11.15; N, 12.52. Found (percent): C, 71.71; H, 11.12; N, 13.33. The spectral data were consistent with the product indicated above.

Example XII

Into 100 ml. of methanol was dissolved 2 g. N,N'-di (2,4,4-trimethyl-2-pentyl) oxalimidyl cyanide, to which was added 1 ml. of H₂O and 0.25 g. of methanesulfonic acid in 10 ml. of methanol. After standing overnight, the mixture was poured into water and a crystalline precipitate was isolated and recrystallized from methanol. Yield: 1.58 g.; M.P. 77–78.5. The product was identified as N,N'-di(2,4,4-trimethyl-2-pentyl) oxamide by comparison with an authentic sample.

Example XIII

To 10 g. of crude product prepared in Example VI in 20 cc. of triethylamine was added 10 cc. of diethylamine resulting in evolution of heat. After one hour standing, all volatiles were removed in vacuo and the residue recrystallized twice from methanol. The yield was 7.1 g. of 1,2-di(tert.-octaylamino)-1-cyano-2-(N,N-dialkylamino) ethylene.

*Analysis.*—Calcd. (percent): C, 73.00; H, 12.25; N, 14.80. Found (percent): C, 73.07; H, 11.87; N, 14.98. The spectral data were consistent with the above named product.

A 5 g. aliquot of the above product was allowed to stand at room temperature in contact with air. The original colorless crystals deliquessed to form a slightly yellow oil. The oil was dissolved in pentane and chromatographed over alumina, eluting with pentane. The product was light yellow crystals. M.P. 28.0–29.5° C. Yield, 3.55 g. 1,2-di(tert.-octylamino)-1-cyano-2-(N,N - diethylamino) ethane. The analysis and spectra were consistent with the above named compound.

The diaminodicyanoethylenes are found to react with a variety of acylating agents to replace the hydrogens on the amine groups with the acylating group. With a difunctional acylating group such as phosgene, it is found that both of the amines react to form a heterocycle. Depending on the linking group between the two nitrogen atoms of the diaminodicyanoethylenes, a variety of mono- and dicyano substituted imidazoles and pyrimidines may be formed.

The amine nitrogen atoms are basic and react with acids to form salts. Since the compositions of the invention are polyamines and for the most part soluble in hydrocarbon solvents, they can act as acid neutralizing agents. The compounds with greater than 20 carbon atoms have emulsification capability.

Because of the plurality of nitrogen atoms present in the compositions of this invention, the compounds are strong chelating agents. The compounds can form mineral oil soluble compounds with coordinating metals such as iron and cobalt. The chelated metals will have reduced effctiveness as oxidizing agents. Alternatively, where oxidation is desirable, the chelated metal compounds can be introduced into hydrocarbons to act as catalysts for oxidation.

The diaminomaleonitriles are readily hydrolyzed in acidic media to form the N,N'-disubstituted oxamide. The tertiary alkyl substituted oxamides find use in compounding rubber and as vulcanization accelerators.

The compounds of this invention are also effective in inhibiting corrosion in fuels and oils, particularly inhibiting rust.

What is claimed is:

1. A method of preparing hydrocarbylamino cyano ketenimines, which comprises:
   (1) combining hydrocyanic acid, hydrofluoric acid and an olefin at a temperature in the range of about −10° to 100° C., wherein the mol ratio of hydrocyanic acid to olefin is in the range of about 0.5–20:1 and the mol ratio of hydrofluoric acid to hydrocyanic acid is in the range of about 0.9–10:1, with the proviso that the mol ratio of hydrofluoric acid to olefin does not exceed about 20:1, and wherein said olefin is selected from aliphatic and alicyclic mono- and non-conjugated polyolefins, allylbenzene, and allylnaphthalene, and
   (2) allowing the reactants to react for 0.5–200 hours to form said hydrocarbylamino cyano ketenimine.

2. A method according to claim 1, wherein the mol ratio of hydrocyanic acid to olefin is in the range of 1–5:1 and the mol ratio of hydrofluoric acid to hydrocyanic acid is in the range of 1–2:1.

3. A method according to claim 1, wherein said olefin is of from 2 to 500 carbon atoms.

4. A method according to claim 1, wherein said temperature is in the range of about 0 to 35° C. and said olefin is of from 4 to 20 carbon atoms.

5. A method according to claim 1, wherein said temperature is in the range of 0 to 35° C. and said olefin is of from 21 to 200 carbon atoms.

6. A method for preparing N,N' - (2,4,4-trimethyl-2-pentyl)-amino cyano ketenimine, which comprises:
   (1) combining hydrocyanic acid, hydrofluoric acid, and 2,4,4-trimethyl-1-pentene, at a temperature in the range of about 0 to 35° C., wherein the mol ratio of hydrocyanic acid to 2,4,4-trimethyl-1-pentene is in the range of about 1–5:1 and the mol ratio of hydrofluoric acid to hydrocyanic acid is in the range of about 1–2:1,
   (2) allowing the reactants to react for at least about 0.5 hour to form said N,N'-di-(2,4,4-trimethyl-2-pentyl)-amino cyano ketenimine,
   (3) removing any remaining hydrofluoric acid and hydrocyanic acid, and
   (4) isolating said N,N' - di(2,4,4-trimethyl-2-pentyl)-amino cyano ketenimine.

7. A method for preparing N,N' - dihydrocarbyl diaminomaleonitrile, which comprises:
   (1) combining hydrocyanic acid, hydrofluoric acid and an olefin at a temperature in the range of about −10° C. to 100° C., wherein the mol ratio of hydrocyanic acid to olefin is in the range of about 2–20:1 and the mol ratio of hydrofluoric acid to hydrocyanic acid is in the range of about 0.9–10:1, with the proviso that the mol ratio of hydrofluoric acid to olefin does not exceed about 20:1, and wherein said olefin is selected from aliphatic and alicyclic mono- and non-conjugated polyolefins, allylbenzene, and allylnaphthalene,
   (2) allowing the reactants to react for 0.5–200 hours to form a hydrocarbylamino cyano ketenimine as a first reaction product,
   (3) adding to the reaction mixture containing said first reaction product a trialkyl amine wherein the alkyl groups each contain 1–6 carbon atoms, and wherein the mol ratio of said trialkyl amine to said olefin is 1–10 mols per mol of said olefin,
   (4) allowing the reactants to react for 0.5–24 hours at a temperature of −20° C. to 50° C. to form said N,N'-dihydrocarbyl diamino maleonitrile, and
   (5) isolating said N,N'-dihydrocarbyl diaminomaleonitrile.

8. A method according to claim 7, wherein said olefin is of from 2 to 500 carbon atoms.

9. A method according to claim 7, wherein said olefin is of from 4 to 200 carbon atoms.

10. N,N'-dihydrocarbylamino cyano ketenimine, wherein said hydrocarbyl group contains from 2 to 500 carbon atoms and is derived from an olefin selected from aliphatic and alicyclic mono- and nonconjugated polyolefins, allylbenzene and allylnaphthalene.

11. N,N' - di(2,4,4 - trimethyl-2-pentyl)-amino cyano ketenimine.

12. N,N' - di(2,4,4-trimethyl-2-pentyl) oxalimidyldinitrile.

References Cited
UNITED STATES PATENTS

| | | | |
|---|---|---|---|
| 3,095,441 | 6/1963 | Kliss | 260—465.5 R |
| 3,138,631 | 6/1964 | Frazza et al. | 260—465 E |
| 3,262,965 | 7/1966 | Janz | 260—465.3 X |
| 3,406,170 | 10/1968 | Papa | 260—465.5 X |
| 3,523,119 | 8/1970 | Jutz et al. | 20—465.5 R X |

OTHER REFERENCES

Norell, J. Org. Chem., 35 (May 1970), pp. 1611–1618.
Norell J. Org. Chem., 35 (May 1970), pp. 1619–1625.

JOSEPH P. BRUST, Primary Examiner

U.S. Cl. X.R.

260—291, 282, 439, 464, 465 E, 465.5 R, 561, 562, 687; 252—390